United States Patent [19]

Biancosino

[11] Patent Number: 5,224,646
[45] Date of Patent: Jul. 6, 1993

[54] DRIPLESS ICE CREAM HOLDER

[76] Inventor: Anthony J. Biancosino, 200 Grover Ave., Princeton, N.J. 08540

[21] Appl. No.: 9,713

[22] Filed: Jan. 27, 1993

[51] Int. Cl.$^5$ ............................................. B65P 85/78
[52] U.S. Cl. ................................ 229/1.5 B; 220/501; 220/521
[58] Field of Search ..................... 229/1.5 B; 220/501, 220/521, 719, 737; 426/115, 130

[56] References Cited

U.S. PATENT DOCUMENTS

| | | | |
|---|---|---|---|
| 1,800,759 | 4/1931 | Shean . | |
| 1,920,995 | 8/1933 | Legge . | |
| 2,215,691 | 9/1940 | East | 220/501 |
| 2,766,123 | 10/1956 | Moubayed . | |
| 2,850,391 | 9/1958 | Gunsberg | 220/501 |
| 2,948,452 | 8/1960 | Grogan et al. . | |
| 3,306,512 | 2/1967 | Pagnini . | |
| 3,379,338 | 4/1968 | Marks et al. | 220/501 |
| 3,476,282 | 11/1969 | Monaco et al. | 426/115 |
| 4,233,325 | 11/1980 | Slangan et al. | 426/130 |
| 4,244,470 | 1/1981 | Burnham | 426/130 |
| 4,444,795 | 4/1984 | Weinstein | 426/130 |
| 4,503,572 | 3/1985 | Dawson | 220/521 |
| 4,574,987 | 3/1986 | Halligan et al. | 426/115 |
| 4,718,594 | 1/1988 | Harazi . | |
| 4,821,906 | 4/1989 | Clark | 426/115 |
| 4,938,411 | 7/1990 | Rizzuto . | |
| 4,992,283 | 2/1991 | Shorey . | |
| 5,135,787 | 8/1992 | Bair | 220/501 |

Primary Examiner—Gary E. Elkins
Attorney, Agent, or Firm—Mathews, Woodbridge & Collins

[57] ABSTRACT

An ice cream holder for collecting liquid from ice cream as it melts includes a peripheral ring with a plurality of apertures and a drinking slot. The holder includes a receptacle having an interior wall, an exterior wall, and a closed bottom portion. A top portion for receiving the ice cream includes a peripheral ring attached to the receptacle having a plurality of apertures through which the melted ice cream passes, and a drinking slot through which the liquid may be withdrawn and consumed. Ice cream is supported in the receptacle on an internal disk having a centrally located aperture through which the melted cream may pass. The internal disk is of such a configuration that a scoop of ice cream may be placed therein, or an ice cream cone may be inserted. Initially, ice cream is placed in the receptacle. As the cream melts, the liquid flows through the apertures in the peripheral ring and drips to the bottom of the receptacle. When the liquid has accumulated in the bottom, the user inverts the receptacle and drinks the liquid through a drinking slot in the peripheral ring. The invention not only prevents drips of the ice cream from contacting the user's clothes or the user, but is versatile in that it can hold a frozen confection or an ice cream cone, and is disposable or reusable.

8 Claims, 3 Drawing Sheets

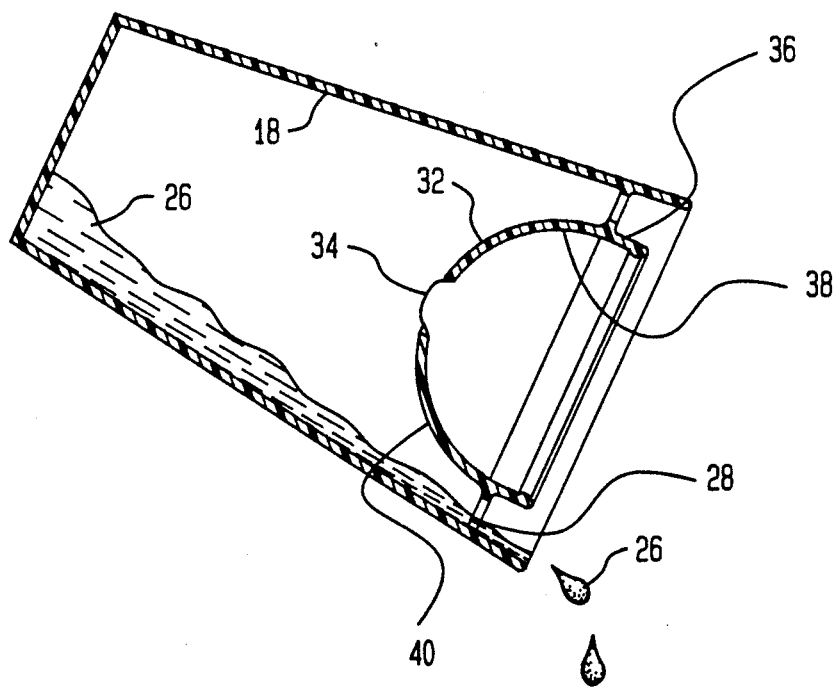

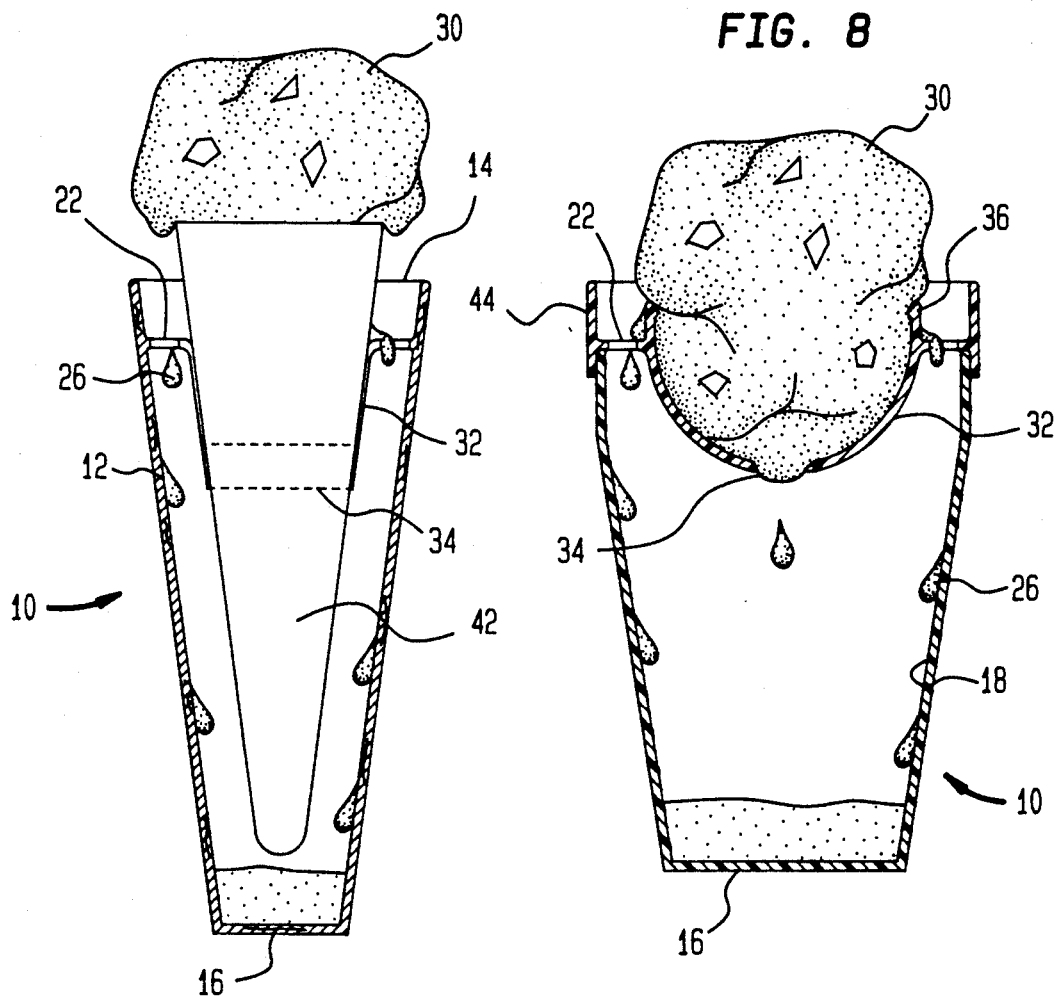
FIG. 6
FIG. 8
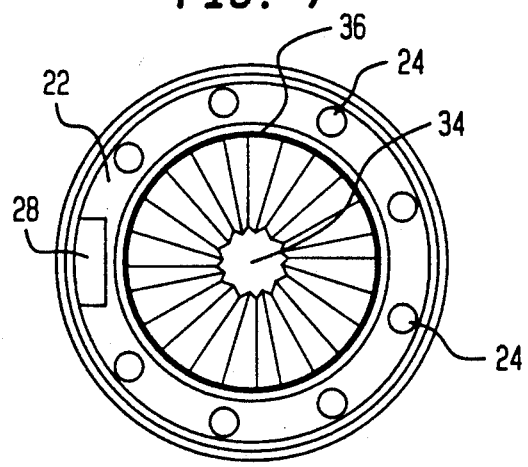
FIG. 7

DRIPLESS ICE CREAM HOLDER

BACKGROUND OF THE INVENTION

1. Field of the Invention

This invention relates to a dripless ice cream holder which collects liquid from a frozen confection through drain holes and allows the user to remove the liquid through a drinking slot, while preventing the liquid from contacting the user.

2. Related Prior Art

Ice cream holders for holding ice cream cones or other frozen confections are known in the art. For example, U.S. Pat. No. 4,992,283 describe, s a frozen confection holder that may be securely grasped by a toddler. An annular upraised collar composed of an edible carbohydrate collects drips from the melting confection.

U.S. Pat. No. 2,766,123 describes a combined frozen confection cup and pipette. A frozen confection is mounted on a pipette attached to a cup. The pipette extends into the cup where the melted confection is collected. By utilizing the upper end of the pipette, the liquid may be withdrawn into the mouth of the user.

U.S. Pat. No. 2,948,452 describes a polyethylene, drip catching, open-ended device which has a conical portion to fit around a cone, and a drip catching tray integral with the conical portion having a turned-up flange or rim. Drips are directed down along the outside surface of the device into the drip catching tray.

U.S. Pat. No. 1,800,759 describes a wax paper ice cream cone holder made from a single piece of material which completely envelops the lower portion of the ice cream cone and catches drippings from the cone which are conveyed to the bottom of the cup along longitudinal grooves in the interior of the holder. After the cone is consumed, the melted confection may be drained from the cup.

Other patent references of general interest include U.S. Pat. No. 4,938,411, which describes a planar member formed from a liquid absorbing material for catching drips. A plurality of intersecting slits are formed in the planar member for receiving a cylindrical or tapered ice cream cone. U.S. Pat. No. 3,306,512 describes an ice cream drip saucer-like tray made of liquid absorbing material which has an opening at its center through which a cone is passed. U.S. Pat. No. 4,718,594 describes a dish having a collar rising from a central aperture of the dish and a flap structure extending down into an aperture in the top of the collar which engages and seals the cone extending through the aperture. Drips of the melted confection are collected in the dish. U.S. Pat. No. 1,920,995 describes a circular tray or saucer having an opening for receiving an ice cream cone. A conically shaped pocket having a flared upper edge is attached to the lower face of the tray for receiving the lower end of the cone.

In summary, none of these devices provide a satisfactory solution to the problem of soiling one's clothes or hands while eating an ice cream cone. Some of the devices for holding an ice cream cone have an open bottom structure, for example, U.S. Pat. Nos. 2,948,452 and 4,718,595, which fail to prevent ice cream from dripping down the outside of the cone or through the bottom of the cone and onto the user. Other devices having a closed bottom structure, for example, U.S. Pat. Nos. 4,992,283 and 1,920,995, prevent ice cream from escaping through the bottom, but the consumer is not protected from spills that may occur if the devices are tilted slightly. Finally, devices having a closed bottom structure and which allow the consumer to drink the melted confection do not provide a drinking slot as in the present invention, for example, U.S. Pat. Nos. 2,776,123, or drain holes which prevent the cone from becoming soggy, for example, U.S. Pat. No. 1,920,995. The present invention is inexpensive, and readily and economically made. The messiness associated with eating ice cream or an ice cream cone is eliminated, and sanitary consumption is achieved, because the consumer's hands never touch the ice cream.

SUMMARY OF THE INVENTION

Briefly described the invention comprises a receptacle having a top portion into which ice cream is placed, and which collects liquid from the melted ice cream through a plurality of apertures located in a peripheral ring attached to the interior wall of the receptacle. The melted ice cream flows through the apertures, drips downwardly, and accumulates at the bottom of the receptacle. A drinking slot located in the peripheral ring allows the melted ice cream to be withdrawn and consumed.

Ice cream or other frozen confections that melt will not drip on a person's clothes or hands using the present invention. The receptacle can be easily held by the user in a substantially upright fashion while eating the ice cream. As the ice cream melts, a plurality of drain holes located around the peripheral ring near the top of the receptacle receive the melted cream. The melted ice cream passes through the drain holes, and drips to the bottom of the receptacle. When the liquid has accumulated at the bottom, it can be consumed by tilting the receptacle and drinking the liquid through a drinking slot adjacent to the interior wall of the receptacle and located in the peripheral ring, or by inserting a straw through the drinking slot and withdrawing the liquid.

The receptacle includes an interior wall, an exterior wall, and a bottom portion. A top receiving portion receives the ice cream. Integral with the top receiving portion of the receptacle is a peripheral ring having a plurality of apertures and a drinking slot. The peripheral ring is integral and attached to the interior wall of the receptacle. Adjacent to the peripheral ring is an internal disk having an open top surface and a bottom surface, and a centrally located aperture. When the internal disk has a concave configuration, it can hold a scoop of ice cream or an ice cream cone. An ice cream cone can be held by the internal disk when the disk has a substantially planar configuration.

The melted ice cream passes downwardly through the apertures in the peripheral ring and drips to the bottom portion of the receptacle without contacting the user or the user's clothes. Removal and consumption of the melted ice cream using the present invention is easy using the drinking slot provided in the peripheral ring. Because the liquid ice cream flows within the interior wall of the receptacle, it does not contact the user or the user's clothes.

These and other features of the invention can be further understood by reference to the following drawings.

BRIEF DESCRIPTION OF THE DRAWINGS

FIG. 5 is an inverted cross sectional view of the invention showing the liquid ice cream flowing through the drinking slot.

FIG. 6 is a cross sectional view of an alternate embodiment of the invention showing the internal disk receiving an ice cream cone.

FIG. 7 is a top plan view of FIG. 6 showing the pleated configuration and the centrally located aperture of the internal disk.

FIG. 8 is a cross sectional view of an alternate embodiment of the invention showing an add-on feature to the receptacle with a bordering edge at the top portion.

DETAILED DESCRIPTION OF THE INVENTION

During the course of this description like numbers will be used to identify like elements according to the different figures which illustrate the invention.

Figure 1:
FIG. 1 is a front perspective view of the preferred embodiment of the invention in context showing the user drinking the melted ice cream.

The holder 10 according to the preferred embodiment of the invention is seen in context in FIG. 1. The holder 10 as shown is inverted by the user 100 while the melted ice cream is consumed.

Figure 2:
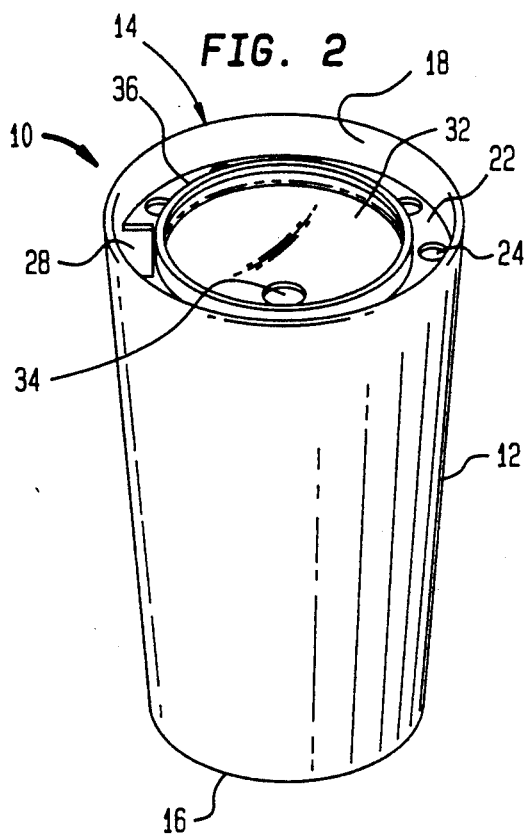
FIG. 2 is a front perspective view of the invention showing the apertures and drinking slot in the peripheral ring of the receptacle.

A front perspective view of the invention is shown in FIG. 2. The receptacle 12 as shown has a peripheral ring 22 attached to the interior wall 18. The peripheral ring 22 is adjacent and substantially perpendicular to the interior wall 18 of the receptacle 12. Around the peripheral ring 22 are a plurality of apertures 24 through which liquid ice cream flows. Also located on the peripheral ring 22 is drinking slot 28. Drinking slot 28 is located adjacent the interior wall and is larger than the apertures 24. Internal disk 32 has a centrally located aperture 34, approximately the same size as apertures 24, through which melted ice cream flows. As shown, the internal disk 32 has a substantially concave shape. Preferably, the disk 32 is formed of pleated material that expands to accomodate a larger scoop of ice cream when placed in the top receiving portion 14. The internal disk 32 also has a raised collar 36 to support a scoop of ice cream.

Figure 3:
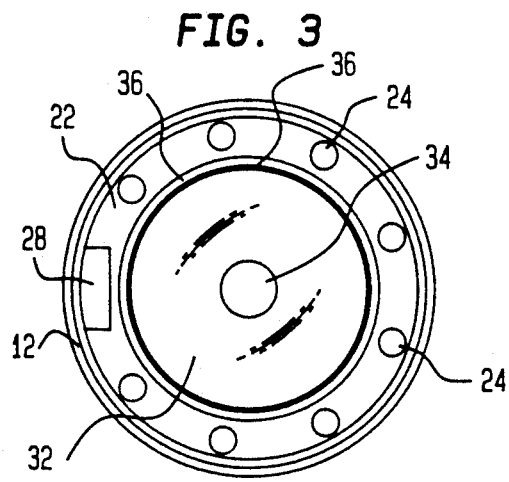
FIG. 3 is a top plan view of the invention showing the apertures and drinking slot in the peripheral ring and the centrally located aperture in the internal disk.

FIG. 3 is a top plan view of the invention. The middle portion of the peripheral ring 22 in the receptacle 12 has a plurality of apertures 24 through which ice cream passes. A drinking slot 28 is located on a portion of the peripheral ring 22 adjacent to the interior wall 18 of the receptacle 12. Located adjacent to the peripheral ring 22 is an internal disk 32 which supports the ice cream in the receptacle 12.

Figure 4:
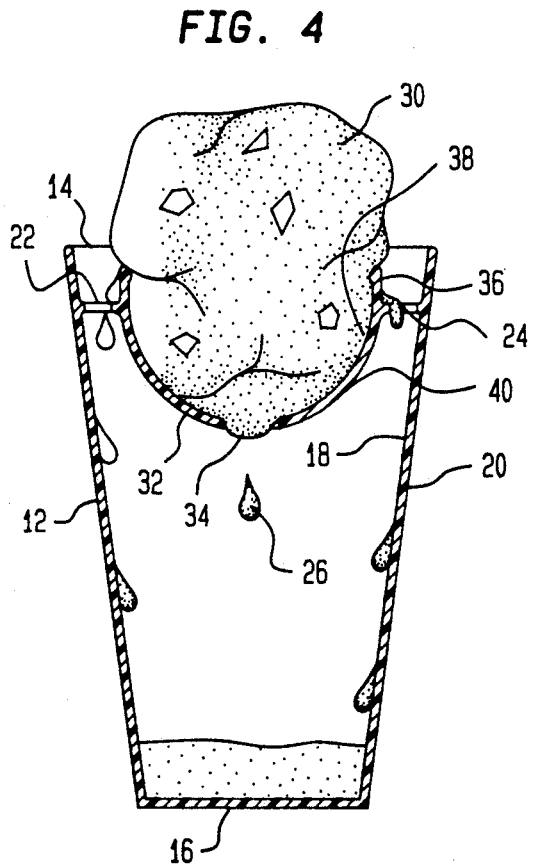
FIG. 4 is a cross sectional view of the invention showing the liquid flowing through the apertures in the peripheral ring and collecting at the bottom of the receptacle.

A cross sectional view of the invention as shown in FIG. 4 comprises a cup-shaped receptacle 12 for holding ice cream 30. The receptacle 12 is defined by a bottom portion 16, an interior wall 18 and an exterior wall 20. The top receiving portion 14 receives the ice cream 30. An internal disk 32 located adjacent a peripheral ring 22 supports a scoop of ice cream 30. As the ice cream 30 melts, the melted cream flows through the apertures 24 in the peripheral ring 22, and drips 26 downwardly toward the bottom portion 16 of the receptacle 12. A centrally located aperture 34 in the internal disk 32 also allows the melted cream to flow through. The liquid 26 accumulates on the bottom portion 16 of the receptacle 12.

An inverted cross sectional view of the invention is shown in FIG. 5. The accumulated liquid 26 within the interior wall 18 of the receptacle 12 is shown flowing through the drinking slot 28 in the peripheral ring 22. Liquid 26 easily flows through the drinking slot 28 as opposed to the apertures 24 in the peripheral ring 22 because the drinking slot 28 is larger than the apertures 24. Referring to FIGS. 1 and 3, when the ice cream 30 has been eaten, the holder 10 is inverted by the user 100. The liquid is drunk by the user 100 through the drinking slot 28. A drinking straw may also be inserted in the drinking slot 28 to withdraw the liquid 26.

An ice cream cone 42 is shown in the holder 10 in FIG. 6. This cross sectional view of the invention shows an alternate embodiment of the internal disk 32. In the embodiment shown, the centrally located aperture 34 can expand to a dimension large enough to hold an ice cream cone 42. The top portion 14 of the receptacle 12 is wide enough to prevent the ice cream 30 from melting down along the exterior wall 20 of the receptacle 12.

FIG. 7 shows a top plan view of the internal disk 32 of FIG. 6. The internal disk 32 is pleated, has a centrally located aperture 34 for receiving an ice cream cone 42, and is substantially planar. When an ice cream cone 42 is inserted through the aperture 34, the internal disk 32 expands to the shape of the cone 42 and holds the cone 42 in place.

An alternate embodiment of the receptacle 12 is shown in FIG. 8. A bordering edge 44 is shown around the top portion 14 of the receptacle 12. This embodiment provides sturdiness to the receptacle 12. The bordering edge 44 can also be attached to the peripheral ring 22. In this embodiment, the edge 44 and peripheral ring 22 form one piece that can be easily attached to or removed from the receptacle 12. In this alternative embodiment, the holder 10 can be made of a hard plastic which can be washed and reused, if desired.

In the illustrated embodiments, unless otherwise specified, the components of the apparatus are made from materials that are disposable, such as laminated cardboard, but that are strong enough to hold ice cream 30 for a reasonable amount of time without degrading or becoming soggy. The receptacle 12 and top portion 14 may also be composed of a hard plastic, which can be washed and reused, if desired. Advertisements or cartoon characters may be placed on the exterior wall 20 of the receptacle 12.

The invention is versatile because it can hold a scoop of ice cream, or an ice cream cone. Although reference has been made to ice cream, it is intended that any frozen confection, including yogurt, can be eaten using the present invention. An added advantage is that the holder is composed of a material that is substantially liquid impervious, and is disposable or reusable.

In summary, the receptacle collects liquid ice cream through apertures while preventing the liquid from contacting the user. Typical ice cream holders normally involve some significant spillage or mess to the user.

The present invention obviates the problems associated with eating ice cream. Liquid ice cream does not contact the user, but instead accumulates on the bottom of the receptacle as the liquid flows through apertures in the peripheral ring. A drinking slot is used to remove the melted cream from the bottom of the receptacle.

While the invention has been described with reference to the preferred embodiment thereof, it will be appreciated by those of ordinary skill in the art that modifications can be made to the structure and form of the invention without departing from the spirit and scope thereof.

I claim:

1. A frozen confection holder apparatus for collecting liquid from said frozen confection as it melts, comprising:
    a receptacle for holding said frozen confection, said receptacle including an interior wall, an exterior wall, and a closed bottom portion;
    a top receiving portion for receiving said frozen confection comprising a peripheral ring attached to said interior wall;
    draining means located around said peripheral ring of said top portion for draining said liquid therethrough to said bottom portion; and,
    liquid removal means located on said peripheral ring and adjacent to said interior wall for removing said liquid from said closed bottom portion,
    wherein when said frozen confection melts, said liquid drips downwardly through said draining means and collects in said closed bottom portion, and said liquid may be removed through said liquid removal means and consumed when said apparatus is at least partially inverted.

2. The apparatus of claim 1 wherein said top receiving portion of said receptacle includes an internal disk attached to said peripheral ring having an open top surface for supporting said frozen confection and a bottom surface, and a centrally located aperture therein to allow said liquid to drain therethrough.

3. The apparatus of claim 2 wherein said draining means comprises a plurality of apertures located around said peripheral ring for draining said liquid therethrough.

4. The apparatus of claim 3 wherein said liquid removal means comprises a drinking slot located on said peripheral ring and adjacent to said interior wall, wherein said liquid can be withdrawn through said drinking slot and consumed.

5. The apparatus of claim 4 wherein said open top surface of said internal disk forms a raised collar around the peripheral ring.

6. The apparatus of claim 5 wherein said internal disk is pleated and substantially planar for receiving an ice cream cone.

7. The apparatus of claim 6 wherein said top receiving portion is composed of a pleated, laminated material.

8. The apparatus of claim 7 wherein said receptacle is composed of a liquid impervious material.

* * * * *